US005488562A

United States Patent [19]
Otterbein et al.

[11] Patent Number: 5,488,562
[45] Date of Patent: Jan. 30, 1996

[54] SYSTEM FOR GENERATING SIGNALS FOR CONTROL OR REGULATION OF A CHASSIS CONTROLLABLE OR REGULABLE IN ITS SEQUENCES OF MOVEMENT

[75] Inventors: Stefan Otterbein, Stuttgart; Dieter Kunz, Ditzingen-Schöckingen; Rainer Kallenbach, Waiblingen-Neustadt; Klaus Landesfeind, Fellbach, all of Germany

[73] Assignee: Robert Bosch GmbH, Stuttgart, Germany

[21] Appl. No.: 969,840

[22] PCT Filed: May 12, 1992

[86] PCT No.: PCT/DE92/00379

§ 371 Date: Jan. 27, 1993

§ 102(e) Date: Jan. 27, 1993

[87] PCT Pub. No.: WO92/21525

PCT Pub. Date: Oct. 12, 1992

[30] Foreign Application Priority Data

May 31, 1991 [DE] Germany ............ 41 17 897.1

[51] Int. Cl.[6] .................... B60G 17/015; B60G 11/26
[52] U.S. Cl. ................ 364/424.05; 280/707; 280/840; 180/41
[58] Field of Search ............... 364/424.05, 426.04; 280/707, 688, 840, 772; 180/170, 197, 41, 282, 140, 153

[56] References Cited

U.S. PATENT DOCUMENTS

| | | | |
|---|---|---|---|
| 4,888,696 | 12/1989 | Akatsu et al. | 364/424.05 |
| 4,970,645 | 11/1990 | Adachi et al. | 364/424.05 |
| 4,978,135 | 12/1990 | Edahiro et al. | 280/707 |
| 5,060,970 | 10/1991 | Kamimura et al. | 280/707 |
| 5,096,219 | 3/1992 | Hanson et al. | 280/707 |
| 5,189,615 | 2/1993 | Rubel et al. | 364/424.05 |
| 5,208,749 | 5/1993 | Adachi et al. | 364/424.05 |

FOREIGN PATENT DOCUMENTS

| | | |
|---|---|---|
| 0249209 | 12/1987 | European Pat. Off. . |
| 0264944 | 4/1988 | European Pat. Off. . |
| 0335016 | 10/1989 | European Pat. Off. . |
| 0358231 | 3/1990 | European Pat. Off. . |
| 0399365 | 11/1990 | European Pat. Off. . |
| 0420199 | 4/1991 | European Pat. Off. . |
| 0426340 | 5/1991 | European Pat. Off. . |
| 3408292 | 8/1985 | Germany . |
| 1485003 | 9/1977 | United Kingdom . |
| WO90/15726 | 12/1990 | WIPO . |

OTHER PUBLICATIONS

International Search Report, Oct. 2, 1992.

Primary Examiner—Kevin J. Teska
Assistant Examiner—Tan Nguyen
Attorney, Agent, or Firm—Baker & Daniels

[57] ABSTRACT

The object of the inventional system is the so-called "modal" variant of the skyhook damping. The advantage of this variant over the local version is essentially constituted by enabling an individual damping of the eigenoscillation forms. Moreover, a definitive roll or sway moment distribution can be adjusted. For that purpose there are signals determined which represent the local vehicle body movements at selected points of the vehicle body. Basing on these signals, the heave, roll and pitch movements are inferred. These movements are differently weighted depending on travel maneuvers. By actuation of the damper systems dependent on the weighted heave, roll and pitch movements a specific influencing of certain components of the body movement is possible.

17 Claims, 3 Drawing Sheets

SYSTEM FOR GENERATING SIGNALS FOR CONTROL OR REGULATION OF A CHASSIS CONTROLLABLE OR REGULABLE IN ITS SEQUENCES OF MOVEMENT

PRIOR ART

The invention is based on a system according to the category of the main claim.

The development of an electronically controlled chassis involves among others the problem of improving the travel comfort. Viewed as a measure of the travel comfort may be the vertical movement of the vehicle body, described for instance by the heave, roll and pitch movement. Information on the momentary motive state of the vehicle is obtained by suitable sensors, for instance acceleration sensors mounted at suitable points of the vehicle body.

For damping the body movements, a strategy called "continuous skyhook damping" has been in existence for a number of years. The pertaining control algorithm can be formulated for both active (Active Damping in Road Vehicle Suspension Systems, Vehicle System Dynamics, 12(1983), pp. 291–316; Passive and Active Control of Road Vehicle Heave and Pitch Motion, 10th IFAC World Congr. 1987, Munich) and semiactive (Semi-Active Heave and Pitch Control for Ground Vehicles, Vehicle System Dynamics, 11(1982), pp. 31–42) chassis control systems. In these chassis control systems the continuous skyhook damping is used in its so-called "local" variant. Here, the vehicle body movements are determined at the attachment points of the actuators which, in turn, are so controlled that a force is applied which counteracts the respective body movements. Such locally acting chassis control system is unable to specifically influence certain motive components of the vehicle body, such as heave, roll and pitch movements.

While with active systems the application of a control force counteracting the vehicle body movements is extensively possible, semiactive systems merely allow the adjustment of the damper characteristic. Known from EP, A,0 197 316 and the German patent application P 39 30 555.4 are semiactive systems which in their effect approximate an active system, although they hardly require (as compared to active systems) energy for adjustment of the damper tuning.

The problem underlying the present inventional system is to influence, in the framework of influencing the vehicle body movements, individual motive components or shares independently of one another and, as the case may be, to different extents. These components include for instance the heave, roll and pitch movements, but also the vertical movement of the vehicle body at the front and rear axles.

This problem is solved by the features characterized in claim 1.

ADVANTAGE OF THE INVENTION

The object of the present invention is the so-called "modal" variant of the skyhook damping. It possesses essentially two advantages over the local variant:

1. Individual damping of single components of the vehicle body movement.
2. Adjustable roll or sway moment distribution.

According to the invention, signals are determined which represent the vertical movement of the vehicle body at selected points. Basing on these signals, the heave, roll and pitch movements are inferred to begin with. These movements are then weighted, and at that, in such a manner that—depending on the tuning of the weighting—the eigenoscillation forms of the vehicle body can be influenced individually. The weighting can be performed, e.g., under allowance for the state of travel, such as braking, accelerating and steering.

Basing on the weighted heave, roll and pitch movements, activation signals are finally determined for the actuators, which with appropriate action ensure that the desired effect will occur, i.e., that the individual shares of the body movement will be damped independently of one another and, as the case may be, to different extents.

Furthermore, the roll or sway moment distribution can be adjusted between the axles of the vehicle.

Favorable embodiments of the invention are characterized in the subclaims.

DRAWINGS

An embodiment of the invention is illustrated in the drawings and more fully explained in the following description.

DESCRIPTION OF EMBODIMENT

Figure 1A:
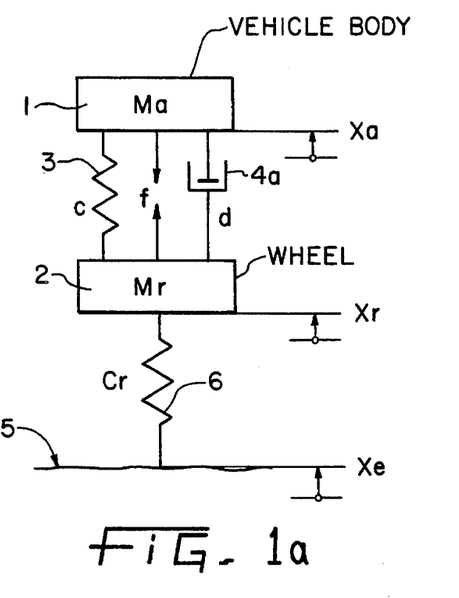
FIGS. 1a and 1b depict the known two-body model (quater car model) which approximates the vertical dynamics of a wheel unit (of a real vehicle).
Figure 1B:
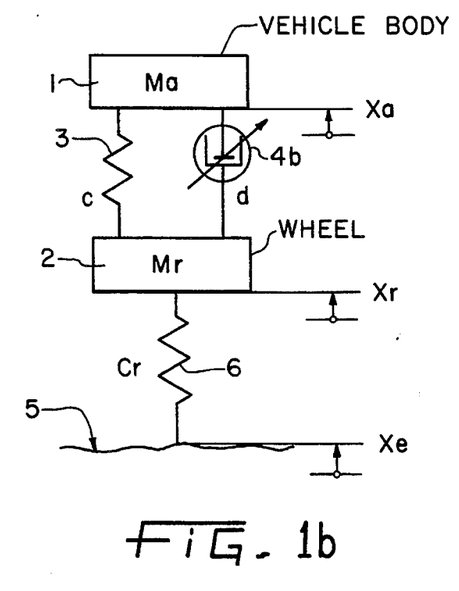

To begin with, this embodiment will address the skyhook control for active or semiactive chassis control systems with the aid of FIG. 1.

FIGS. 1a and 1b show the known two-body model (quarter car model) approximating the vertical dynamics of a wheel unit. Referenced 1 is the vehicle body with the prorated mass Ma. Reference 2 represents the wheel with the prorated mass Mr, reference 6 a spring with the spring constant Gr. The road surface is referenced 5, while 4a marks a passive damper with the damping constant d, reference 4b a semiactive damper, and reference 3 a spring (spring constant C) arranged parallel to the dampers.

In FIGS. 1a and 1b the wheel 2 is in contact with the road surface 5. Here, the tire stiffness is described in model fashion as spring 6 with the spring constant Gr.

In the two-body model of FIG. 1a, the spring 3 and damper 4a represent the components of a passive chassis, while the force f stands for a control force which is additionally active between the body and the axle, or wheel unit. The control force f suggests the model notion that, independently of the state of movement of vehicle body and wheel, it may assume selective values.

The skyhook control algorithm now can be stated as $$f = ds * Xa' \tag{1}$$

Hence, the control force f is to be adjusted in proportion to the vehicle body velocity Xa', the suffix " ' " to a variable meaning in the following always the first temporal derivation, which is a (not negative) tuning parameter with the dimension of a damping constant (SAE unit: Ns/m).

An active chassis control system can be realized, e.g., by a hydraulic cylinder between the vehicle body and axle, or wheel unit, which cylinder is controlled by a valve with a large bandwidth. The control force f (from the model) is then to be understood as a set force to be followed optimally well by the actual actuator force, backed by an underlying control circuit.

In the two-body model relative to FIG. 1b, the symbol with the pointer represents a damper 4b whose damping characteristic is continuously adjustable. This property can be modeled, for instance by making the damper force fd proportional to the relative velocity Xa'−Xr', that is, $$fd = dv*(Xa'-Xr') \quad (2)$$

with a damping "constant" dv which at a certain interval [dmin, dmax], 0< dmin<dmax can assume selective values.

Hence, the damper force assumes in semiactive systems the function of the control force, and the skyhook control algorithm now assumes the form $$fd = d*(Xa'-Xr') + fd^\circ \quad (3a)$$

with $$fd^\circ = \begin{cases} ds*Xa', & \text{for } Xa'*(Xa'-Xr') > 0 \\ 0, & \text{for } Xa'*(Xa'-Xr') \leq 0 \end{cases} \quad (3b)$$

Here again, ds is a (not negative) tuning parameter with the dimension of a damping constant (SAE unit: Ns/m). The control force fd thus is composed of the share d*(Xa'−Xr') representing the passive damper of FIG. 1a and the share fd° ensuring that the algorithm (1) will be adopted from the case of active systems if an (adjustable) damper can generate the same force as a hydraulic cylinder. Deriving from a comparison of (2) and (3), incidentally, is the actually required value of the damping "constant:"

$$dv = \begin{cases} d + [ds*(Xa'/(Xa'-Xr'))], & \text{for } Xa'*(Xa'-Xr') > 0 \\ d, & \text{for } Xa'*(Xa'-Xr') \leq 0. \end{cases}$$

A damper with adjustable characteristic can be realized, for instance, by a so-called throttle actuator, i.e., by a damper featuring in its piston a throttle valve whose flow cross section is variable. Another option is a so-called force actuator, a damper with suitable pressure-limiting valves (as the case may be, with servo support) in its piston. The same as in the case of an active system, the control force (from the model) is to be understood as the set force here as well, so that the two realization options addressed need to be equipped, for the case of semiactive systems, with underlying control circuits as well.

Basically, the continuous skyhook damping can be applied (both in he active and semiactive version) in the so-called "local" variant. This means that the procedure on each wheel unit of the vehicle follows the presented scheme, independently of the processes on the other wheel units. To be understood as the vehicle velocity Xa' is the respective vertical velocity of the attachment point of the hydraulic cylinder or damper to the vehicle body, while by the relative velocity Xa'−Xr' the one at the pertaining wheel unit is meant.

Employed for determining the vehicle body velocities, e.g., may be acceleration sensors to be mounted at the appropriate points of the vehicle body. The velocities themselves are obtained by suitable processing (filtering and integration) of the sensor signals. Furthermore, with semiactive systems, information is required on whether the damper is momentarily in the traction or thrust stage. This information may be secured by sensors capturing the spring deflection movements of the vehicle body relative to the wheel unit. The spring deflection velocities may be determined, e.g., by a suitable signal processing (filtering and differentiation) of signals from spring deflection path sensors.

Knowing the spring deflection paths is useful also for other chassis control tasks, for instance for level control.

The continuous skyhook damping (again in the active as well as semiactive case) may be employed also in other variants. Required though is then a precise definition of the vehicle body velocity.

The basic idea of the modal skyhook damping is understanding as the body velocities the so-called modal velocities. This makes it possible to influence the eigenoscillation forms of the body independently of one another and weighted differently heavily.

For explanation of the concepts of eigenoscillation form, modal coordinate and major oscillation, the following should be noted first:

Similar to any system capable of oscillation, also a vehicle (regarding its vertical movement) possesses a specific number of eigenoscillation forms ("modes") with pertaining modal, or major, coordinates ("modal coordinates"). Every (vertical) movement of the vehicle—at any point in time—may be envisaged to be composed of the eigenoscillation forms, with the share varying though, in the course of time, at which each individual eigenoscillation form partakes in the movement. The significance of the modal coordinates now is constituted by their quantitatively describing the distribution of the shares or components: at any moment of the movement, the value of any modal coordinate is identical to the share at which the pertaining eigenoscillation form contributes to the movement.

Specific (vertical) movements of the vehicle are its major oscillations ("modal motions"): These are characterized in that during the entire movement there is only a single eigenoscillation form represented. Thus, all modal coordinates—with only one exception—have always the value zero.

Automotive engineering frequently uses the coordinates "heave" (vertical displacement of the center of gravity), roll angle (pivot about its longitudinal axis) and pitch angle (pivot about its transverse axis) for description of the (vertical) movement of the vehicle body. If these coordinates are also modal coordinates, there exists for instance a "pitch major oscillation" where strictly a pitch movement is concerned in the sense that the center of gravity is at rest and no roll movement is taking place either (heave and roll components are not represented). In contrast, if only the roll angle is a modal coordinate, two of the major oscillations are coupled heave-pitch movements; the vertical movement of the center of gravity is linked to a pitch movement—and vice versa; dominant with one of these major oscillations is then the heave component ("much" heave, "little" pitch) while in the other the pitch component is predominant.

Whether the heave, roll and pitch angles of the vehicle body actually are modal coordinates depends essentially on two factors. For one, on the vehicle itself; for another, on the way in which the chassis control system is configured (fully active or semiactive). Generally, it can be said that the roll is a modal coordinate if the chassis is arranged longitudinally symmetrically on the vehicle body and when the major inertial axes of the vehicle body coincide with is longitudinal, transverse and vertical axes. This vehicle property would seem to apply to many of today's vehicles; it applies independently of the particular chassis control system used.

In the case of vehicles with a semiactive chassis control system, realized for instance by a chassis with conventional springs and regulable dampers, the heave and pitch angles are not always modal coordinates also. Namely, this is the case only when a specific correlation is given between the spring stiffnesses $c_v$, $c_H$ of the support springs on the front and rear axles and the axle distances a1 and a2 from the center of gravity of the vehicle body (a1*$c_v$=a2*$c_H$). Hence, if the ratio a1*$c_v$/a2*$c_H$ equals approximately one, a practically effective (nearly ideal) decoupled influencing of heave, roll and pitch movements is achievable.

Important for the applications is a second case in which a specific correlation exists between the inertial moment $I_N$ of the vehicle body with regard to its transverse axis, its mass $m_k$ and the axle distances a and c ($I_N=m_k*a_1*a_2$); this correlation applies, at least by approximation, to some of today's vehicle types. In this case, the modal coordinates—besides the roll angle—are given by the vertical displacements ($z_v$ and $z_H$) of the body "front" and "rear." Here it is thus possible and also suitable to influence the body movement "front" and "rear" as well as the roll movement independently of one another with the aid of the control.

$$1/(\det A) * \begin{pmatrix} x2*y3 - x3*y2 & x3*y1 - x1*y3 & x1*y2 - x2*y1 \\ -(x2-x3) & -(x3-x1) & -(x1-x2) \\ -(y2-y3) & -(y3-y1) & -(y1-y2) \end{pmatrix} \quad (4)$$

where det A=(y2–y3)*x1+(y3–y1)*x2+(y1–y2)*x3 and xi and yi are the coordinates of the point (Pi) with regard to a body-fixed coordinate system with the center of gravity of the body as zero point, where the index i=1,2,3 and the vehicle body is in model fashion assumed to be two-dimensional, and the coordinates (xi, yi) of the points (Pi) are so selected that (det A) is not zero.

Figure 2:
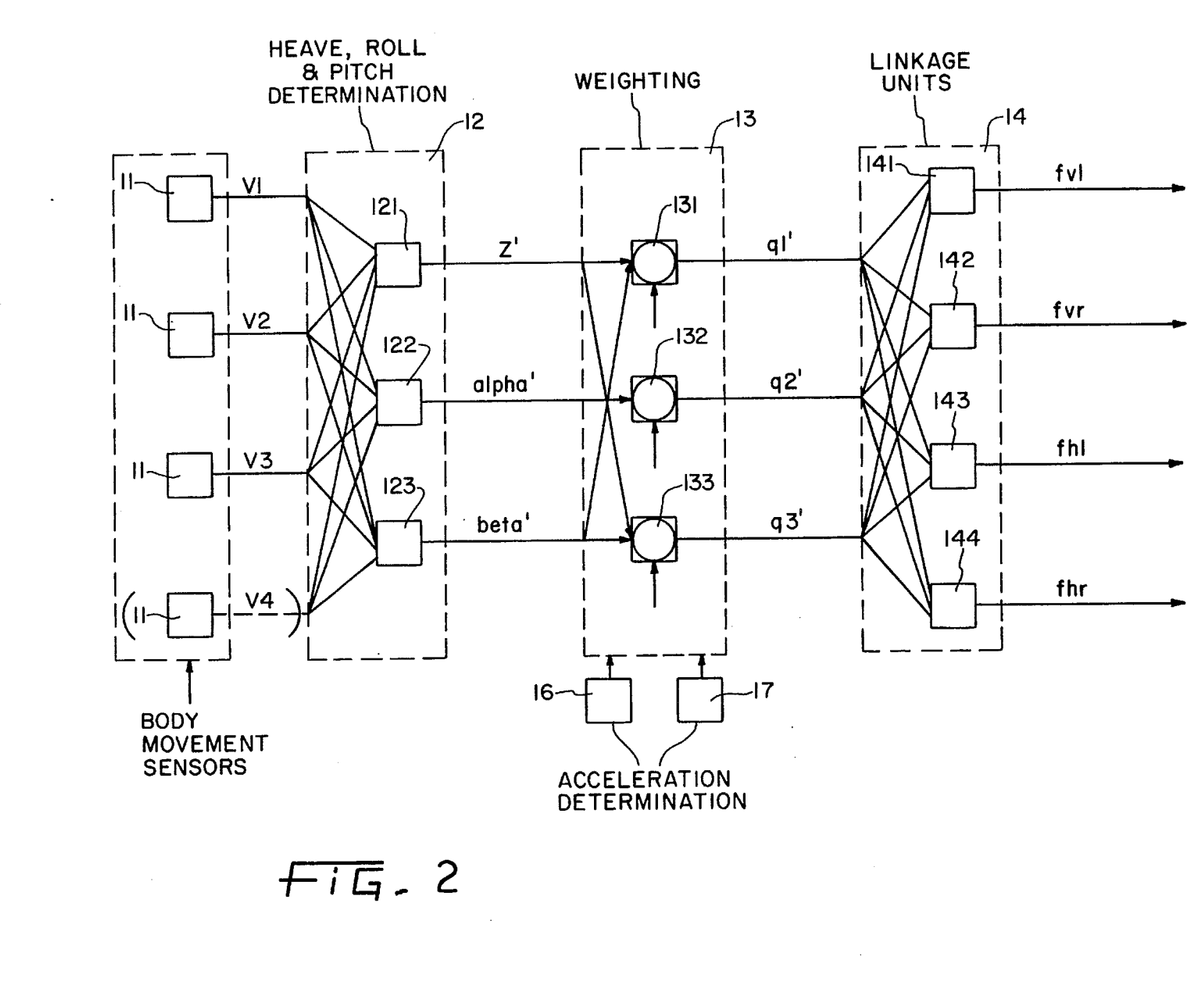
FIG. 2 illustrates the essential elements of the inventional system in the framework of the following embodiment.

In the second means (12) the first signals (V1, V2, V3) are thus combined linearly as described hereafter.

$$\begin{pmatrix} z' \\ alpha' \\ beta' \end{pmatrix} = 1/(\det A) * \begin{pmatrix} x2*y3 - x3*y2 & x3*y1 - x1*y3 & x1*y2 - x2*y1 \\ -(x2-x3) & -(x3-x1) & -(x1-x2) \\ -(y2-y3) & -(y3-y1) & -(y1-y2) \end{pmatrix} * \begin{pmatrix} V1 \\ V2 \\ V3 \end{pmatrix} \quad (5)$$

FIG. 2, in the framework of the present embodiment, shows the essential elements of the system. Marked 11 are first means for determining the body movements, while 12, within dashed bordering, references second means for determining the heave, roll and pitch movements, with linkage units 121, 122 and 123. Referenced 13, in dashed bordering, are third means for weighting, with 131, 132 and 133 marking further linkage units. Referenced 14, in dashed bordering, is a combination of linkage units 141, 142, 143 and 144. Marked 16 and 17 are sixth means for determining the transverse and longitudinal acceleration of the vehicle.

The following describes and illustrates with the aid of FIG. 2 the mode of operation of the inventional system in the framework of the embodiment.

Determined in the first means (11) are first signals (Vi) representing indirectly or directly the vehicle body velocities in vertical direction at selected points (Pi) of the body. The first signals (Vi) may be obtained for instance by integration of acceleration sensor signals, with the acceleration sensors so mounted at points (Pi) on the body that they capture the vertical accelerations of the body. The conditions for selection of the points (Pi) will be addressed in more detail yet in the course of the present description.

The first signals (Vi) now are transmitted to the second means (12) where they are linked to one another. This linkage occurs in the units 121, 122 and 123.

This linkage unit, the same as all others of the system, can be realized in electronic digital or electronic analog fashion using electronic components, by simulation of a matrix representing the linkage properties. Moreover, a computer-controlled configuration of the units is possible.

The linear linkages of the first signals (Vi) among one another in the second means (12) can be represented mathematically in matrix notation, requiring a differentiation between two cases:

First Case:

Represented by the first signals (V1, V2, V3) are the velocities of the vehicle body in vertical direction at three selected points (P1, P2, P3) of the body. In this case, the linkage in the second means (12) is obtained by the following matrix The linkages among one another are obtained in mathematically formal fashion by matrix multiplication of the three-component vector (V1, V2, V3) by the matrix (4). The individual units 121, 122 and 123 may be laid out as multiplying or adding units, for instance according to the vector matrix multiplication algorithm, as follows.

Unit 121:

1/(det A)*[V1*(x2*y3–x3*y2)+V2*(x3*y1–x1*y3)+V3*(x1*y2–x2*y1)]

Unit 122:

1/(det A)*[–V1*(x2–x3)–V2*(x3–x1)–V3*(x1–x2)]

Unit 123:

1/(det A)*[–V1*(y2–y3)–V2*(y3–y1)–V3*(y1–y2)]

Second Case:

The first signals V1, V2, V3, V4 represent the velocities of the vehicle body in vertical direction at four selected points (P1, P2, P3, P4) of the body. In this case, the linkage in the second means (12) is given by the following matrix $$1/2 * \begin{pmatrix} B11 & B12 & B13 & B14 \\ B21 & B22 & B23 & B24 \\ B31 & B32 & B33 & B34 \end{pmatrix} \quad (6)$$

where

B11=B12=–x3/(x1–x3) and

B13=B14=x1/(x1–x3) and

B21=–B22=y1/(y1²+y3²) and

B23=–B24=y3/(y1²+y3²) and

B31=B32=–1/(x1–x3) and

B33=B34=1/(x1–x3) and xi and yi are the coordinates of the point (Pi) with regard to a body-fixed coordinate system with the center of gravity of the body as zero point, where the index i=1,2,3,4 and the vehicle body is in model fashion assumed to be two-dimensional, and the coordinates (xi, yi) of the points (Pi) are so selected that x3 is not equal to x1, y1²+y3²>0, x2=x1, y2=–y1, x4=x3 and y4=–y3.

In the second means (12) the first signals (V1, V2, V3, V4) are thus linearly combined as described hereafter.

$$\begin{pmatrix} z' \\ alpha' \\ beta' \end{pmatrix} = 1/2 * \begin{pmatrix} B11 & B12 & B13 & B14 \\ B21 & B22 & B23 & B24 \\ B31 & B32 & B33 & B34 \end{pmatrix} * \begin{pmatrix} V1 \\ V2 \\ V3 \\ V4 \end{pmatrix} \quad (7)$$

The linkages among one another are obtained in mathematically formal fashion by matrix multiplication of the four-component vector (V1, V2, V3, V4) by the matrix (7). The individual units 121, 122 and 123 can in this case be configured as multiplying and adding units, for instance according to the vector matrix multiplication algorithm, as follows.

Unit 121: 1/2*(V1*B11+V2*B12+V3*B13+V4*B14)

Unit 122: 1/2*(V1*B21+V2*B22+V3*B23+V4*B24)

Unit 123: 1/2*(V1*B31+V2*B32+V3*B33+V4*B34), where the variables Bij are defined as described above.

The linkage results (z', alpha' and beta') prevailing in both cases on the outputs of the second means (12), respectively on the outputs of the filter units (121, 122, 123), represent the heave, roll and pitch velocities. The pivots of the vehicle body about its longitudinal or transverse axis are signified here by alpha or beta, respectively, and the vertical displacement of the center of gravity of the body by z. Alpha', beta' and z' are the respective first time derivatives of the variables alpha, beta and z.

The second signals (z', alpha', beta') are now transmitted to the third means (13) where they are weighted. This takes places in the linkage units 131, 132 and 133 according to the matrix $$\begin{pmatrix} gkk & 0 & gkn \\ 0 & gw & 0 \\ gnk & 0 & gnn \end{pmatrix} \quad (8)$$

where all matrix elements are to be viewed as tuning parameters.

In the third means (13), the second signals (z', alpha', beta') are thus combined linearly as described hereafter:

$$\begin{pmatrix} q1' \\ q2' \\ q3' \end{pmatrix} = \begin{pmatrix} gkk & 0 & gkn \\ 0 & gw & 0 \\ gnk & 0 & gnn \end{pmatrix} * \begin{pmatrix} z' \\ alpha' \\ beta' \end{pmatrix} \quad (9)$$

The linkages to another are obtained in mathematically formal fashion by matrix multiplication of the three-component vector (z', alpha', beta') by the matrix (9). The individual linkage units 131, 132 and 133 may in this case be configured, for instance according to the vector matrix multiplication algorithm, as multiplying and adding units as follows.

Unit 131: (z'*gkk)+(beta'*gkn)

Unit 132: alpha'*gw

Unit 133: (z'*gnk)+(beta'*gnn).

For interpretation of the third signals (q1', q2', q3') the special case should be considered first in which—besides the roll angle—the heave and pitch angles are the modal coordinates of the vehicle body ($a1*c_v=a_2*c_H$). To be selected here is qkn=qnk=0, so that (q1', q2', q3') can be interpreted as weighted heave, roll and pitch velocities. A differently heavy weighting results then in a differently heavy damping of these motive components. This is suitable for instance with steering, braking or acceleration maneuvers in order to allow the roll and pitch movements of the vehicle body initiated thereby to ebb off swiftly.

As second special case, one may be cited in which—besides the roll angle—the vertical displacement of the vehicle body "front" and "rear" are the modal coordinates ($I_N=m_k*a_1*a_2$). In this case, the four parameters gkk, gnk, gkn and gnn can be so tuned to one another that the variables q1' and q3' may be interpreted as weighted body velocities on the front and rear axles using mutually independent coefficients of weighting. A differently heavy weighting of these two coefficients produces then a differently heavy damping of the body oscillations on the front and rear axles.

In the general case, the third signals can be thought of as weighted modal velocities, again with usually independent coefficients of weighting. A differently heavy weighting results then in a differently heavy ebbing of the eigenoscillations of the vehicle body.

The weighting of the second signals (z', alpha', beta') is favorably carried out in the third means (13) dependent on the travel dynamics, such as longitudinal and/or transverse movements of the vehicle, and/or the ambient temperature. To be understood by travel dynamics here is specifically the transverse and/or longitudinal acceleration of the vehicle and/or the travel speed. The travel dynamics can be determined, for instance in sixth means (16, 17), as described hereafter:

The transverse movements of the vehicle may be determined from signals of a steering angle sensor, which signals are utilized also for a servo steering control or regulation.

The longitudinal movements of the vehicle may be determined from signals of wheel speed sensors, which signals are used for instance also in an antilock system.

The longitudinal and/or transverse movements of the vehicle may be determined from signals of appropriately positioned acceleration sensors.

The longitudinal movements of the vehicle may be determined by the position of the gas pedal and/or brake pedal actuated by the driver.

In summary, it can be said regarding the influencings in the third means (13) that here a specific influencing of the modal components of motion— that is, of the eigenoscillation forms of the vehicle body—is possible, for instance to emphasize or dampen a specific movement in the subsequent data evaluation. Thus, the weighting will favorably be selected depending on steering, braking and acceleration maneuvers of the vehicle, in order to allow the roll and pitch movements of the vehicle, or its vertical movements on the front and rear axles, initiated thereby to ebb off swiftly.

In a simple configuration of the inventional system, the third means (13) may be circumvented. However, a specific influencing of the various motive components is then not possible.

Prevailing on the outputs of the third means (13) are thus the third signals (q1', q2', q3')

In the case of a four-wheel, two-axle vehicle where active or semiactive actuators are arranged between each wheel and the vehicle body, the weighted, or amplified modal velocities prevailing on the outputs of the third means (13) or the uninfluenced heave, roll and pitch velocities which under circumvention of the third means (13) are present on the outputs of the second means (12) are linked among one another in the fourth means (14). The fourth means (14) can be characterized by the so-called fourth distribution matrix as follows.

$$1/2 * \begin{pmatrix} F11 & F12 & F13 \\ F21 & F22 & F23 \\ F31 & F32 & F33 \\ F41 & F42 & F43 \end{pmatrix} \quad (10)$$

The elements of matrix (10) are

F11=F21=a2/(a1+a2)

$F31=F41=a1/(a1+a2)$ $F12=-F22=(1/b1)*(ro/ro+1)$ $F32=-F42=(1/b2)*(1/ro+1)$ $F43=F33=-F23=-F13=1/(a1+a2)$, and a1 is the distance between the center of gravity of the vehicle body and the front axle, a2 is the distance between the center of gravity of the vehicle body and the rear axle, 2*b1 is the spacing of the attachment points of the actuators to the vehicle body at the front axle, and 2*b2 is the spacing of the attachment points of the actuators to the vehicle body at the rear axle.

The meaning of the variable ro will be explained farther down.

In the fourth means (14), thus, the amplified modal velocities (q1', q2', q3') or the unweighted heave, roll and pitch velocities (z', alpha', beta') are linearly combined as described hereafter. Carried out explicitly here is only the case where the weighted linkage results (q1', q2', q3') are processed in the fourth means (14). The unweighted third signals (z', alpha', beta') are processed analogously.

$$\begin{pmatrix} fvl \\ fvr \\ fhl \\ fhr \end{pmatrix} = 1/2 * \begin{pmatrix} F11 & F12 & F13 \\ F21 & F22 & F23 \\ F31 & F32 & F33 \\ F41 & F42 & F43 \end{pmatrix} * \begin{pmatrix} q1' \\ q2' \\ q3' \end{pmatrix} \quad (11)$$

The linkages among one another are obtained in mathematically formal fashion by matrix multiplication of the three-component vectors (q1', q2', q3') by the force distribution matrix (10). The individual filter units 141, 142, 143 and 144 may in this case be configured as multiplying and adding units, for instance according to the vector matrix multiplication algorithm, as follows.

Unit 141: $(F11*q1')+(F12*q2')-(F13*q3')$

Unit 142: $(F21*q1')-(F22*q2')-(F23*q3')$

Unit 143: $(F31*q1')+(F32*q2')+(F33*q3')$

Unit 144: $(F41*q1')-(F42*q2')+(F43*q3')$ where the variables Fij are defined as described above.

Prevailing as results of the linkages on the outputs of the fourth means (14) are the linkage results (fvl, fvr, fhl, fhr) representing control forces. These control forces are to be viewed as set forces for the hydraulic cylinders (active system) or for the adjustable dampers (semiactive systems).

The linkage results (fvl, fvr, fhl, fhr) are used to initiate the actuators. By action of the activation signals (fvl, fvr, fhl, fhr) on the actuators, control forces corresponding to the set forces are applied.

Hence, the skyhook damping takes place in the local mode, by this activation, due to these control forces.

For the physical interpretation of the force distribution matrix (10) it may be assumed that the correlation (11) is equivalent to the equations $fvl+fvr+fhl+fhr=q1'$ (12a)

$b1*(fvl-fvr)+b2*(fhl-fhr)=q2'$ (12b)

$-a1*(fvl+fvr)+a2*(fhl+fhr)=q3'$ (12c)

$b1*(fvl-fvr)-ro*b2*(fhl-fhr)=0$ (12d).

For proof, one only needs to form the linear combinations of the forces (fvl, fvr, fhl, fhr) stated on the left in (12), and substitute the forces themselves by the right sides of (11).

The correlation (12d) can be represented also as $ro=[b1*(fvr-fvl)]/[b2*(fhr-fhl)]=const1$, (13), where the roll movements of the two front control forces can be recognized in the numerator and the roll moment of the two rear control forces in the nominator. The parameter ro describes thus the roll or sway moment distribution (front/rear) of these forces, while equation (13) says that the distribution is temporally independent. Furthermore, its value in the force distribution matrix is freely selectable. Thus, by selection of the parameter ro one arrives at an adjustable sway and/or roll moment distribution of the control forces.

Figure 3:
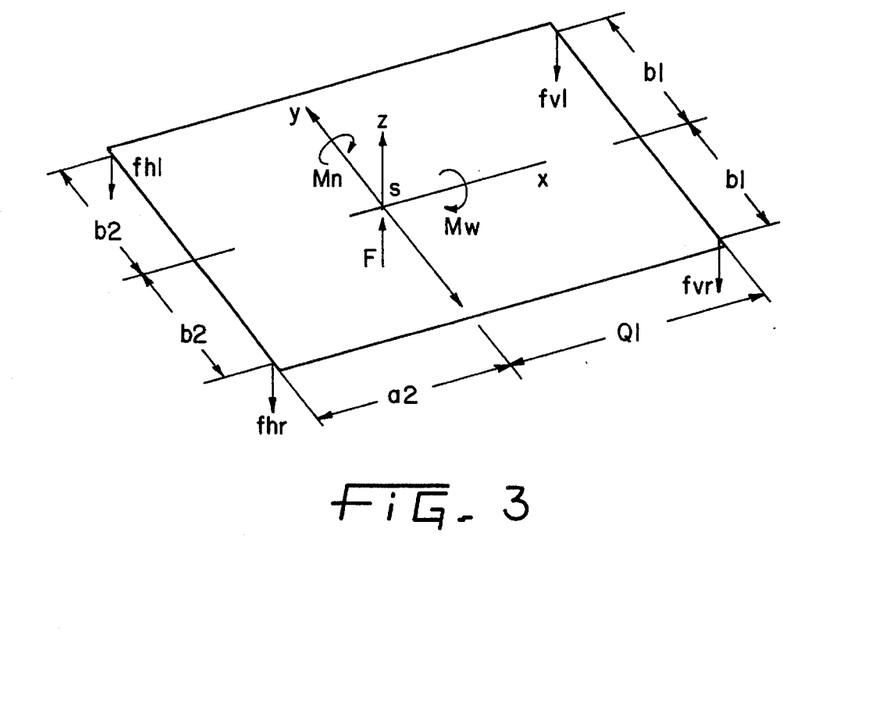
FIG. 3 shows a cross section of the vehicle body, FIG. 4 a block diagram of an error recognition system.

For the physical interpretation of the remaining correlations in (12), the equations of movement $Ma*z''=-(fvl+fvr+fhl+fhr)+F$ (14a)

$Iw*\text{alpha}''=-b1*(fvl-fvr)-b2*(fhl-fhr)+Mw$ (14b)

$In*\text{beta}''=a1*(fvl+fvr)-a2*(fhl+fhr)+Mn$ (14c)

of the vehicle body may be reviewed, where the "''" symbol suffixed to the variables means the second temporal derivation of the respective variable. In this context, FIG. 3 shows a sectional illustration of the vehicle body. F is the resultant of the forces that are not control forces. Such forces are exerted by the passive chassis components on the vehicle body. Furthermore, also disturbance force etc. are allowed for in the resultant F. Mw and Mn are the resultant moments of these forces about the longitudinal and transverse axes. Referenced Iw and In are inertial moments about the respective axes. The equations of motion (14) are valid under the model notion that the vehicle body forms a rigid body, and for small pivots alpha and beta from the position of equilibrium (compare FIG. 3).

When determining the control forces (fvl, fvr, fhl, fhr) with the aid of the force distribution matrix, that is, according to equation (11), the equations of motion (14) assume the form for the controlled movement $(Ma*z'')+(gkk*z')+(gkn*\text{beta}')=F$ (15a)

$(Iw*\text{alpha}'')+(gw*\text{alpha}')=Mw$ (15b)

$(In*\text{beta}'')+(gnk*z')+(gnn*\text{beta}')=Mn$ (15c).

This follows directly from the correlations (12) and (9).

Considering first again the special case in which—besides the roll angle—the heave and pitch angle are the modal coordinates of the vehicle body $(a_1*c_v=a_2c_H)$. Here, the weighting factors gkn and gnk are to be selected at zero if the modal coordinates are supposed to be influenced independently of one another. Clearly evident is then the effect of the remaining tuning parameters gkk, gw and gnn: gw, for instance, dampens essentially alone the roll movement (a coupling to the heave or pitch movement exists only if the moment $M_w$ depends on these movements). The effect of gkk and gnn is similar; that is, an individual damping of the heave, roll and pitch oscillations is being enabled.

In the second special case, in which—besides the roll angle—the vertical displacements of the car body "front" and "rear" are the modal coordinates $(I_N=m_k* a_1* a_2)$, or also in the general case, gkn and gnk must generally be chosen different from zero and all weighting factors suitably tuned to one another.

When considering the described proposal for improvement of the travel comfort incorporated in a more comprehensive chassis control concept, it is evident—as mentioned already above—that it is suitable to select the values of all weighting factors dependent on the momentary values of the state of travel variables, such as travel speed, longitudinal and transverse acceleration. For instance in braking and accelerating, gkk and specifically gnn will be selected large (as compared to gw), in order to allow the created heave-pitch oscillations, or vertical oscillations at the front and rear axles, to ebb off quickly. In approaching a curve, in contrast, a large value of gw (as compared to gkk and gnn) will have a favorable effect, since the stimulated roll movements will then be quickly reduced. In this fashion, finally, a certain number of parameter sets can be established which are coordinated to certain travel situations and maneuvers (characterized by value ranges of the state of travel variables).

When using semiactive systems it is necessary to determine signals representing the relative movements between the wheel units and the vehicle body and to perform the damper adjustments by comparisons of the actuation signals (fvl, fvr, fhl, fhr) to the spring deflection movements (refer to equation 3b). Furthermore, in the case of set forces escaping realization, a maximally hard or maximally soft adjustment may be chosen in lieu. This may be effected, as described for instance in the German patent application P 39 30 555.4, in that the relative movements between the wheel units and the vehicle body are allowed for in such a manner that, as a substitute, a hard or soft adjustment is chosen depending on the set force and these relative movements.

The spring deflection movements of the vehicle body may be captured for instance by sensors determining the spring deflection path and/or the spring deflection velocity. Specifically, the signals representing the spring deflection path can be differentiated for determining the spring deflection velocity.

If in the first means (11) the first signals (Vk, with k=1 through 4) representing the velocities of the vehicle body in vertical direction at selected points (P1, P2, P3, P4) of the body are determined, another favorable embodiment of the inventional system is arrived at as described in the following.

Due to capturing the vertical body velocities at four points, agreement exists regarding the determination of the three components of movement, heave, pitch and roll movement. This can be utilized for error recognition of the sensor system and/or the signal processing of the inventional system.

Figure 4:
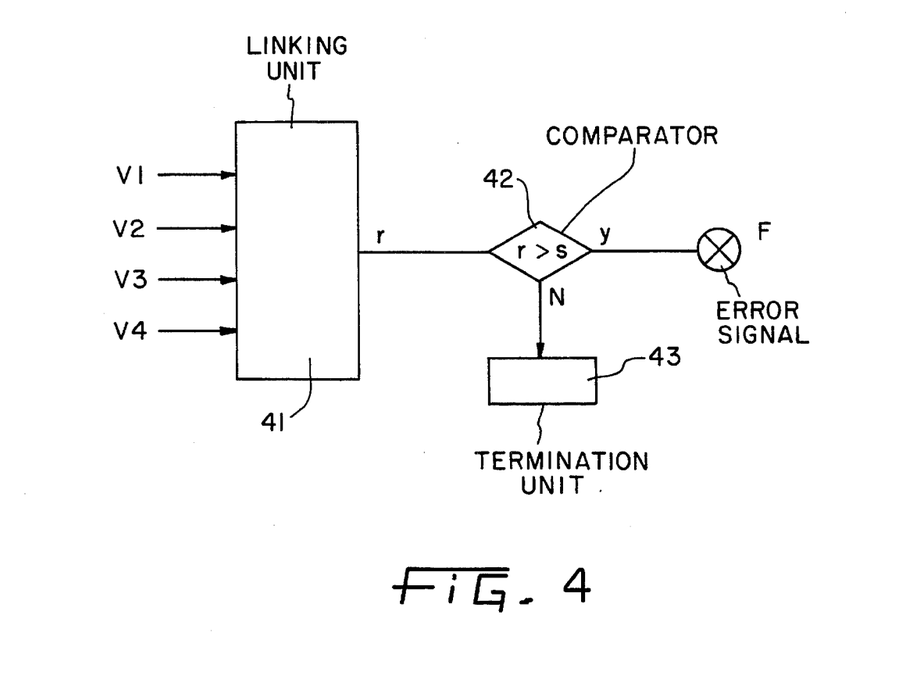

For that purpose, as illustrated in FIG. 4, the first signals (Vk, with k=1 through 4) are relayed to ninth means (41) which link the first signals (Vk, with k=1 through 4) to the coordinates of the points (Pi) where the body movements are determined. This linkage is carried out according to the following mathematical rule:

$$r = \sum_{i=1}^{4} \left( \sum_{k=1}^{4} rik * Vk \right)^2,$$

where the elements rik are given by the matrix R $$R = 1/2 * [1/(y1^2 + y3^2)] * \begin{pmatrix} -y3^2 & y3^2 & y1*y3 & -y1*y3 \\ y3^2 & -y3^2 & -y1*y3 & y1*y3 \\ y1*y3 & -y1*y3 & -y1^2 & y1^2 \\ -y1*y3 & y1*y3 & y1^2 & -y1^2 \end{pmatrix}$$

and yi represent the coordinates of the point (Pi) in the transverse direction of the vehicle with regard to a body-fixed coordinate system having the center of gravity of the body as zero point, where the index i=1,2,3,4, y2=−y1 and y4=−y3 and the vehicle body is in model fashion assumed to be two-dimensional.

The output signal (r) of the ninth means (41) is now compared in the comparator unit (42) to the specified thresholds (tuning parameters). If the value (r) exceeds this threshold, an error signal (F) is displayed. If the value (r) is not exceeded, that is, if no error function exists, step (43) terminates the sequence shown in FIG. 4.

We claim:

1. A control system for controlling and regulating a vehicle body, said vehicle body subject to heave, pitch, and roll movements, said body connected to a plurality of wheels, a deflectable spring, and first and second adjustable suspension systems, said first and second suspension systems connected between said body and respective said wheels, said first and second suspension systems being individually independently adjustable to influence movements of said respective wheels relative to said body, said control system comprising:

means for determining a plurality of first signals which respectively represent body velocities at a plurality of preselected points of said body;

means for generating second signals based on said first signals, said second signals representing heave, roll, and pitch movements of said body;

means for generating third signals based on said second signals, said third signals representing eigenoscillation forms of said body velocities; and means for generating actuating signals based on said third signals, for independently adjusting said first and second suspension systems.

2. The control system of claim 1 for controlling and regulating a vehicle having front and rear axles, said first and second suspension systems respectively associated with said front and rear axles, wherein said actuating signal generating means independently adjusts said first and second suspension systems to adjust for roll movements.

3. The control system of claim 1 for controlling and regulating a vehicle wherein said suspension systems apply forces between the wheels and the vehicle body, wherein said actuating signal generating means generates actuating signals for exerting control forces said suspension systems which correspond to set forces.

4. The control system of claim 3 for controlling and regulating a vehicle wherein the suspension systems are semiactive suspension systems, said control system including means for determining deflection movements of a said spring, said actuating signal generating means generating semiactive control signal based on a comparison of said actuating signals with said spring deflection movements, whereby said semiactive control signals specify application of one of a maximally hard and a maximally soft setting.

5. The control system of claim 3 for controlling and regulating a vehicle wherein the said suspension systems are semiactive suspension systems, said control system including means for determining relative movements between the said wheels and the vehicle body, said actuating signal generating means generating semiactive control signals based on said set forces and the relative movements between the said wheels and the said vehicle body, whereby said semiactive control signals specify application of one of a maximally hard and a maximally soft setting.

6. The control system of claim 3 for controlling and regulating a vehicle having suspension systems with nonlinear performance and wherein said actuating signals include linear control voltages, said control system further comprising means to compensate for the said nonlinear control performance of the said suspension systems and to generate control forces corresponding to the said set forces.

7. The control system of claim 1 for controlling and regulating a vehicle wherein the said suspension systems are semiactive suspension systems, said control system further comprising a plurality of damper systems having means for actuating damper pistons.

8. The control system of claim 7 wherein said actuating means includes a throttle valve having a flow cross section which is variable.

9. The control system of claim 7 wherein said actuating means includes a pressure-limiting valve.

10. The control system of claim 1 wherein said first signals represent velocities of the vehicle body in a vertical direction, said actuating signal generating means including weighting means for arithmetically weighting said third signals with variables related to travel dynamics of the vehicle, and said actuating signal generating means further including combining means for combining two signals from said third signals and said weighted third signals, and said combining means provides signals for exerting control forces on the suspension systems which correspond to set forth.

11. The control system of claim 10 wherein said weighting means weights said second signals according to the matrix:

$$\begin{vmatrix} gkk & 0 & gkn \\ 0 & gw & 0 \\ gnk & 0 & gnn \end{vmatrix}$$

where each coefficient gkk, gkn, gw, gnk and gnn depends on one of a constant value and a variable relating to travel dynamics of the vehicle.

12. The control system of claim 10 for controlling and regulating a vehicle wherein the said vehicle has four wheels, two axles, and two springs, said first and second suspension systems each including a damper, said damper and said deflectable springs arranged between a said wheel and the said vehicle body, wherein said combining means combines said second signals and weighted signals according to the matrix:

$$1/2 * \begin{vmatrix} F11 & F12 & F13 \\ F21 & F22 & F23 \\ F31 & F32 & F33 \\ F41 & F42 & F43 \end{vmatrix}$$

where
F11=F21=a2/(a1+a2);
F31=F41=a1/(a1+a2);
F12=−F22=(1/b1)*(ro/ro+1);
F32=−F42=(1/b2)*(1/ro+1);
F43=F33=−F23=−F13=1/(a1+a2);

a1 is the distance between the center of gravity of the vehicle body and the front axle;

a2 is the distance between the center of gravity of the vehicle body and the rear axle;

2*b1 is the spacing of the attachment points of a said damper to the vehicle body at the front axle;

2*b2 is the spacing of the attachment points of a said damper to the vehicle body at the rear axle;

whereby said signals for exerting the set forces are generated.

13. The control system of claim 1 wherein said actuating signal generating means generates said actuating signals depending on travel dynamics of said vehicle, said travel dynamics including at least one of the transverse and longitudinal acceleration of the vehicle, and the vehicle travel speed, said control system further comprising means for determining the said travel dynamics which includes at least one of the following:

means for determining transverse movements of the vehicle body based on signals of steering angle sensors;

means for determining longitudinal movements of the vehicle body based on signals of wheel speed sensors;

means for determining longitudinal and transverse movements of the vehicle body based on signals of acceleration sensors; and means for determining longitudinal movements of the vehicle body based on the position of an operator activated pedal.

14. The control system of claim 1 for controlling and regulating a vehicle which includes acceleration sensors connected to the said vehicle body at preselected points for generating signals representing vertical accelerations of the said vehicle body, wherein said means for determining a plurality of said first signals determines said first signals by integrating the acceleration sensor generated signals.

15. The control System of claim 14 wherein said plurality of first signals represent velocities of the said vehicle body in the vertical direction at three preselected points of the said vehicle body, and said second signal generating means linearly combines said first signals using the matrix:

$$1/(\det A) * \begin{vmatrix} x2*y3 − x3*y2 & x3*y1 − x1*y3 & x1*y2 − x2*y1 \\ −(x2 − x3) & −(x3 − x1) & −(x1 − x2) \\ −(y2 − y3) & −(y3 − y1) & −(y1 − y2) \end{vmatrix},$$

where det A=(y2−y3)*x1+(y3−y1)*x2+(y1−y2)*x3;

xi and yi are coordinates of the selected points with regard to a body-fixed two-dimensional coordinate system having a center of gravity of the body as zero point, with index i=1,2,3; and the coordinates (xi, yi) of the selected points have values such that (det A) does not equal zero.

16. The control System of claim 14 wherein said plurality of first signals represent velocities of the said vehicle body in a vertical direction at four preselected points of the said vehicle body, and the said means for generating second signals linearly combines said first signals using the matrix:

$$1/2 * \begin{vmatrix} B11 & B12 & B13 & B14 \\ B21 & B22 & B23 & B24 \\ B31 & B32 & B33 & B34 \end{vmatrix}$$

where
B11=B12=−x3/(x1−x3);
B13=B14=x1/(x1−x3 );
B21=−B22=y1/(y1$^2$+y3$^2$);
B23=−B24=y3/(y1$^2$+y3$^2$);
B31=B32=−1/(x1−x3);
B33=B34=1/(x1−x3);

xi and yi are the coordinates of the four points with respect to a body-fixed two-dimensional coordinate system having a center of gravity of the vehicle body as zero point, with the index i=1,2,3,4;

the coordinates (xi, yi) of the four points have values such that x3 is not equal to x1, y1$^2$+y3$^2$>0, x2=x1, y2=−y1, x4=x3 and y4=−y3.

17. The control system of claim 1 wherein said first signals represent velocities of the said vehicle body in a vertical direction at four preselected points of the said vehicle body, said control system further comprising means for generating an error signal based on said first signals, said error signal being determined according to the mathematical equation of the variable r:

$$r = \sum_{i=1}^{4} \left( \sum_{k=1}^{4} rik * Vk \right)^2,$$

where

Vk represents one of said first signals associated with said first point, with k=1 through 4;

with the elements rik given by the matrix R:

$$R = 1/2 * [1/(y1^2 + y3^2)] *$$

$$\begin{vmatrix} -y3^2 & y3^2 & y1*y3 & -y1*y3 \\ y3^2 & -y3^2 & -y1*y3 & y1*y3 \\ y1*y3 & -y1*y3 & -y1^2 & y1^2 \\ -y1*y3 & y1*y3 & y1^2 & -y1^2 \end{vmatrix}$$

where yi representing coordinates of a preselected point in the transverse direction of the vehicle with respect to a body-fixed two-dimensional coordinate system having a center of gravity of the body as zero point, where the index i=1,2,3,4;

y2=−y1 and y4=−y3;

said error signal generating means comparing the value of the variable r to predetermined thresholds, and said error signal generating means generating an error signal if said predetermined thresholds are exceeded.

* * * * *